United States Patent [19]

Davis, Jr.

[11] 4,281,046
[45] Jul. 28, 1981

[54] DRY CELL WITH ELECTROLYTE DISPERSION CHANNELS THROUGH THE CATHODE MIX

[75] Inventor: Charles Davis, Jr., Warrensville Heights, Ohio

[73] Assignee: Union Carbide Corporation, New York, N.Y.

[21] Appl. No.: 162,587

[22] Filed: Jun. 24, 1980

[51] Int. Cl.$^3$ ............................................. H01M 2/36
[52] U.S. Cl. ..................................... 429/72; 429/199; 429/224; 29/623.2
[58] Field of Search .......... 429/72, 224, 229, 199–201, 429/171; 29/623.1, 623.2

[56] References Cited

U.S. PATENT DOCUMENTS

| 3,255,049 | 6/1966 | Wolfe | 136/107 |
| 3,932,196 | 1/1976 | Alberto et al. | 136/107 |

FOREIGN PATENT DOCUMENTS 50-92416  7/1975  Japan .

Primary Examiner—Charles F. LeFevour
Attorney, Agent, or Firm—Cornelius F. O'Brien

[57] ABSTRACT

A dry cell employing a cathode depolarizer mix cake having a plurality of spaced apart internal channels within the annular volume of the mix, and into which a portion of the cell's electrolyte is fed for distribution throughout the mix.

14 Claims, 5 Drawing Figures

DRY CELL WITH ELECTROLYTE DISPERSION CHANNELS THROUGH THE CATHODE MIX

FIELD OF THE INVENTION

This invention relates to a sealed galvanic dry cell and a method for producing it and more particularly to a cell system having a depolarizer mix cake in which additional electrolyte added after mix cake formation is better distributed throughout the compressed depolarizer mix cake thereby providing a longer shelf and service life for the cell.

BACKGROUND OF THE INVENTION

In the manufacture of a dry cell, it is desirable to provide the cell with a sufficient amount of electrolyte so that maximum mix depolarizing efficiency can be maintained during the life of the cell. During the manufacture of many types of dry cells, the depolarizing mix is usually stamped into a so-called bobbin (ordinarily with a carbon cathode current collector rod in the center thereof) or the depolarizer mix is fed by a ram or extruded into paperlined cells. Although the cell's electrolyte can be uniformly mixed with the depolarizer to form a mix, too much electrolyte in the latter type cells would render the mix unhandlable during its assembly into paper-lined cells. Thus in order to maintain maximum handling characteristics and productive capacity, the mix is generally kept relatively dry and, therefore, not suitable for best performance in the cells. It, therefore, is frequently desired to add additional water or electrolyte to the mix after it is assembled in the cells. This has previously been done by using an absorbent washer impregnated with water or electrolyte on the top of the depolarizer mix or by just adding water or electrolyte without the aid of a washer on top of or adjacent the mix. A disadvantage of the impregnated washer is that it requires an additional component within the cell and that it retains some of the water and/or electrolyte.

U.S. Pat. No. 3,255,049 discloses the use of a gelatinous solution on top of the depolarizer mix of a dry cell in which the gelatinous solution contains water and/or electrolyte so that after a few hours, the water and/or electrolyte in the solution will penetrate into the depolarizer mix while leaving a binder near the top.

It is an object of the present invention to provide a dry cell with a depolarizer mix cake having an increased quantity of electrolyte distributed throughout the mix cake so as to insure good shelf and service life for the cell.

Another object of the present invention is to improve the discharge efficiency of dry cells.

The foregoing and additional objects will become more fully apparent from the following description and the accompanying drawings.

SUMMARY OF THE INVENTION

The invention relates to a dry cell comprising an anode; a cylindrical porous cathode depolarizer mix cake comprising an oxidic depolarizer, finely divided conductive material and an electrolyte; a separator disposed between said anode and said depolarizer mix cake; and a cathode collector rod longitudinally embedded in the center of said cathode depolarizer mix cake; the improvement wherein a plurality of spaced apart internal channels extends through and within the annular volume of the cathode depolarizer mix cake parallel to the cathode collector rod and terminates in the cathode depolarizer mix cake, and wherein the electrolyte in the cathode depolarizer mix cake is maximum at the vicinity of the wall area defining said internal channels.

Preferably, the internal channels should extend through the mid-circle of the cross-sectional annular area of the cathode depolarizer mix cake so that the electrolyte fed into the channels will be able to permeate into and through the mix cake thereby providing better distribution of the added electrolyte throughout the mix cake.

In addition, the piercing operation usually employed to form the channels will further compress the cathode depolarizer mix by 10% and more against the separator and the cathode collector rod thereby insuring good interfacial contact between these components during discharge of the cell.

The invention also relates to a process for producing a dry cell comprising the steps (a) assembling within a cylindrical cupped container the active components of a dry cell including in addition to an anode, a cylindrical cathode depolarizer mix cake, a separator disposed between said anode and said cathode depolarizer mix cake and a cathode collector rod longitudinally embedded in said cathode depolarizer mix cake and protruding from the container;

(b) providing a plurality of spaced apart internal channels extending through and within the annular volume of the cathode depolarizer mix cake parallel to the cathode collector rod and terminating within the cathode depolarizer mix cake;

(c) feeding a predetermined amount of electrolyte solution into the longitudinal channels;

(d) placing a disc-like cover over the opening of said container; and (e) sealing the cover to the container.

Preferably, step (b) can be performed as follows:

(b') placing an annular washer on top of the depolarizer mix with the cathode collector rod protruding through the opening in the washer; and (b") inserting a piercing means through the washer and into the cathode depolarizer mix cake and then removing the piercing means while restraining the washer thereby providing a plurality of spaced apart internal channels extending through and within the annular volume of the cathode depolarizer mix cake parallel to the cathode collector rod and terminating within the cathode depolarizer mix cake.

The benefit of the restrained annular washer is that it acts as a parting and wiping member that will remove any of the depolarizer mix that adheres to the piercing means. The annular washer could preferably be made of paper and/or plastic based material.

The size of the channel openings can vary as long as the openings are sufficient to permit electrolyte to be fed into the depolarizer mix where the electrolyte can permeate through the mix to provide a greater quantity of the electrolyte throughout the depolarizer mix. The cross-sectional shape of the channels could be substantially circular, rectangular, square, oval, triangular or any polygonal shape or combinations thereof. Preferably, the cross-sectional area of the channels before adding electrolyte should be between about 2% and about 10% of the cross-sectional area of the annular depolarizer mix cake and/or the volume of the channels should be between about 1 and about 15% of the mix volume. The number of channels should be two or more preferably spaced equally apart about a circle to insure a uniform distribution of the added electrolyte to the depolarizer mix. The channels should extend through the depolarizer mix and terminate within the mix thereby insuring that the piercing means will not cut the cell's bottom separator and allow the depolarizer mix to contact the anode of the cell which could result in internal short circuiting of the cell. However, to provide maximum uniform longitudinal distribution of the electrolyte in the depolarizer mix, the channels should extend as deeply as practical within the depolarizer mix so that the electrolyte fed into the channels will have maximum accessibility to the internal mix.

Preferably, there should be four flattened oval spaced-apart channels (90° spacing) whcih are radially oriented and pass through the mid-circle of the annular area of the cathode depolarizer mix cake. A larger number of channels will provide more openings through which the electrolyte can be fed but other factors, such as tooling and maintenance expense, may negate the benefit of having a larger number of channels.

The present invention will become more apparent from the following description thereof when considered together with the accompanying drawings which are set forth as being exemplary of embodiments of the present invention and are not intended, in any way, to be limitative thereof and wherein.

Figure 1:
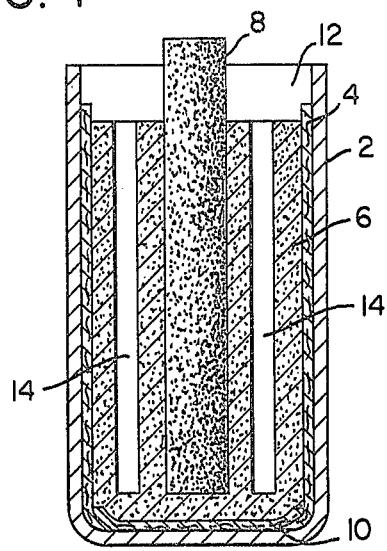
FIG. 1 is a sectional elevation taken through a partially assembled dry cell showing a cathode depolarizer mix with internal channels and a cathode collector rod within a container anode.

Referring in detail to FIG. 1, there is shown a partially assembled typical galvanic dry cell including a cylindrical container 2 which is made of an electrochemically consumable metal such as zinc and which serves as the anode for the cell. The cell container 2 includes therein separator liner 4, a cathode depolarizer mix cake 6 containing, for example, manganese dioxide, a conductive material such as carbon black and an electrolyte which may contain a surfactant. The cathode depolarizer mix cake 6 could be formed by feeding into container 2 a wet mix containing most of the cell's electrolyte and then the cathode collector rod 8 could be forced down into the center of the depolarizer mix 6. The cathode collector rod 8 could be a carbon rod impregnated with a wax or an organic resin to render it both liquid and gas impermeable if desired. The cathode collector rod 8 is inserted into the depolarizer mix 6 such that its end protrudes through the open end of the container 2. Separator 4 surrounds the cathode depolarizer mix 6 and separates it from the inner side wall of the container 2 while a bottom cup separator 10 separates the depolarizer mix 6 from the bottom inner surface of container 2. The separator may be a thin film separator, e.g., a thin bibulous paper coated with a paste. The top of the separator 4 is shown extended into the usual air space 12 which can accommodate any liquid spew that may be formed on discharge of the cell. The cell could be closed in a conventional manner such as disclosed in U.S. Pat. No. 3,255,049, 3,802,923, and 3,932,196, said patents being incorporated herein by reference.

Figure 2:
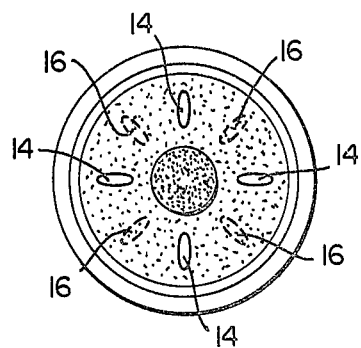
FIG. 2 is a top view of the partially assembled dry cell of FIG. 1.

As shown in FIGS. 1 and 2, four radially oriented spaced-apart oval type channels 14 extend through and within the depolarizer mix cake 6 parallel to the cathode collector rod 8 and terminating within the depolarizer mix 6 a little above the bottom. As stated above, the channels 14 should not extend through bottom cup separator 10 because if any of the depolarizer mix 6 contacts the electro-chemical consumable metal container 2, the cell could internally short. As evident from FIGS. 1 and 2, the addition electrolyte could be directly injected into the channels 14 where it would then penetrate the cathode depolarizer mix cake 6 resulting in the added quantity of electrolyte being more uniformly distributed throughout the mix. The wall of the cathode depolarizer mix 6 defining the channels 14 will absorb a maximum amount of the added electrolyte and the channel openings may contract.

If desired, additional channels 16 could be placed in the cathode depolarizer mix 6 as shown by the broken line oval channels 16 in FIG. 2. Preferably, the channels should be equally spaced and pass through the mid-circle of the annular area of the depolarizer mix as shown in FIG. 2. This will provide a more uniform distribution of the added electrolyte in the depolarizer mix cake.

Figure 3:
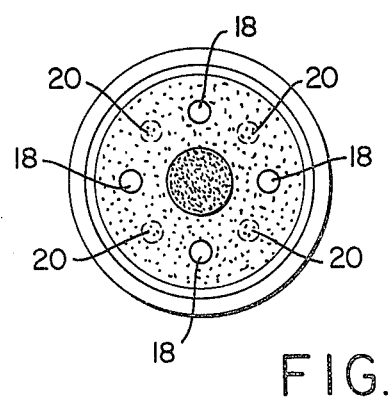
FIG. 3 is a top view of the partially assembled dry cell of FIG. 1 showing another embodiment of the invention.

FIG. 3 shows the top view of a cell similar to that shown in FIG. 2 except that the channels 18 are circular in cross section. Again, additional channels 20 can be formed in the depolarizer mix 6 as shown by the broken lines.

Figure 4:
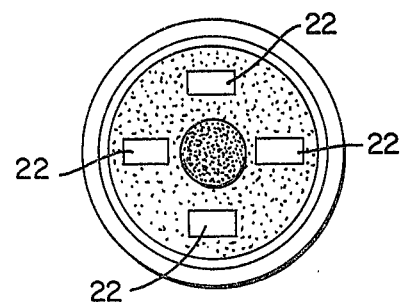
FIG. 4 is a top view of the partially assembled dry cell in FIG. 1 showing another embodiment of the invention.

FIG. 4 shows the top view of a cell similar to that shown in FIG. 2 except that the channels 22 are rectangular in shape and all are oriented parallel to each other. As stated above, the channels could also be triangular in cross section or assume any polygonal shape.

Figure 5:
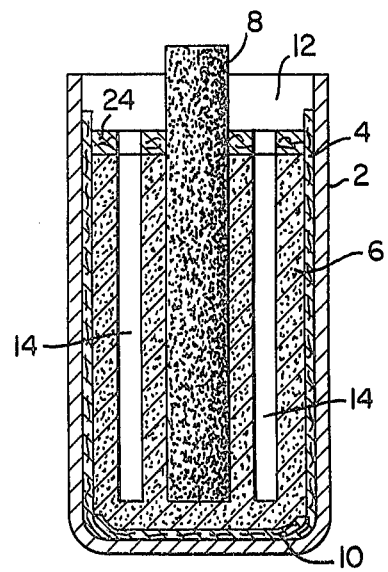
FIG. 5 is a sectional elevation taken through a partially assembled dry cell showing a cathode depolarizer mix with internal channels, a cathode collector rod and an annular washer within a container anode.

FIG. 5 shows a partially assembled cell as in FIG. 1 having the same components identified with the same reference number but also containing an annular washer 24. This washer 24 is positioned over the depolarizer mix 6 before forming the channels 14 so that upon withdrawal of the piercing means after the channels are formed, the restrained washer 24 will provide a wiping means for cleaning the piercing means as they are withdrawn. This will insure against any depolarizer mix contacting the rim of the container which could cause internal shorting. Alternatively, all or a second portion of the added electrolyte could be fed on top of the depolarizer mix and/or to the top of the annular washer if employed. This will further insure that the separator will remain moist during discharge of the cell.

In addition to the zinc chloride cell systems, this invention can also be used in other cell systems such as Leclanch cells employing an aqueous zinc chloride and ammonium chloride electrolyte solution.

The mix piercing operation should be performed as soon as practical after the cathode formation to avoid stressing a weakened wet separator.

EXAMPLE 1

Cylindrical zinc chloride dry cells, each having an anode container outer diameter of 1.257 inch (3.19 cm), an inner diameter of 1.217 inch (3.09 cm) and a height of 2.045 inches (5.19 cm), were constructed as shown in FIGS. 1 and 2. The anode of each cell consisted of a zinc cylindrical container having therein a cathode depolarizer mix composed of manganese dioxide, carbon black and an electrolyte composed of aqueous zinc chloride. A thin, bibulous separator paper surrounded the cathode depolarizer mix thereby separating the mix from the internal wall of the zinc container. A carbon collector rod having a diameter of 0.313 inch (0.795 cm) was disposed within the center of the mix with its top portion projecting above the mix. The cell was suitably sealed in a conventional manner. Sample lot A of three cells was made in the conventional manner without any longitudinal channels but with 1 cc electrolyte added to the top of the mix cake. Sample lot B was made in an identical manner except that four flattened oval type channels measuring 0.624 inch (1.58 cm) in cross sectional area was formed in the cathode depolarizer mix as basically shown in FIGS. 1 and 2, which increased the compactness of the mix by 12%. An amount of electrolyte equal to about 1.0 cc was fed into the top of the mix cake. Sample lot C was made in an identical manner as sample lot B except that 2 cc was fed on top of the depolarizer mix. Sample lot D was made as in Sample lot C except 1 cc of the electrolyte was injected into the channels and an additional amount of about 1 cc electrolyte was fed onto the top of the mix cake. The four lots of cells were discharged across a 2.25-ohm load for four minutes an hour for eight hours a day until various cut-off voltages were reached. These data are shown in Table 1.

TABLE 1

| Cutoff Voltage (volts) | Sample Lot A Time (minutes) | Sample Lot B Time (minutes) | Sample Lot C Time (minutes) | Sample Lot D Time (minutes) |
| --- | --- | --- | --- | --- |
| 1.1 | 337 | 375 | 390 | 440 |
| 1.0 | 537 | 582 | 604 | 633 |
| 0.9 | 674 | 709 | 727 | 750 |
| 0.65 | 934 | 930 | 917 | 935 |

As evident from the above, the cells made in accordance with this invention (Cell Lots B, C and D) showed longer service life over cells made in the conventional manner. While the present invention has been described with reference to many particular details thereof, it is not intended that these details should be construed as limiting the scope of this invention.

What is claimed is:

1. A dry cell comprising an anode; a cylindrical porous cathode depolarizer mix cake comprising an oxidic depolarizer, finely divided conductive material and an electrolyte; a separator disposed between said anode and said depolarizer mix cake; and a cathode collector rod longitudinally embedded in the center of said cathode depolarizer mix cake; the improvement wherein a plurality of spaced apart internal channels extends within the annular volume of the cathode depolarizer mix cake parallel to the cathode collector rod and terminates within the cathode depolarizer mix cake, and wherein the electrolyte in the cathode depolarizer mix cake is maximum at the vicinity of the wall area defining said channels.

2. In the dry cell of claim 1 wherein the channels extend through the mid-circle of the cross-sectional annular area of the cathode depolarizer mix cake.

3. In the dry cell of claims 1 or 2 wherein the channels are substantially ovally shaped.

4. In the dry cell of claims 1 or 2 wherein the channels are substantially rectangularly shaped.

5. In the dry cell of claims 1 or 2 wherein the channels are circularly shaped.

6. In the dry cell of claims 1 or 2 wherein the anode is zinc and the depolarizer mix cake comprises manganese dioxide, carbon black and an electrolyte composed of an aqueous zinc chloride solution or an aqueous zinc chloride and ammonium chloride.

7. In the dry cell of claim 1 wherein an annular washer is disposed over the cathode depolarizer mix with the cathode collector rod protruding through an opening in the washer and wherein the washer has a like number of openings corresponding to and oriented above the channels in the depolarizer mix.

8. In the dry cell of claim 7 wherein the washer contains a portion of the cell's electrolyte.

9. In the dry cell of claims 7 or 8 wherein the anode is zinc and the depolarizer mix cake comprises manganese dioxide, carbon black and an electrolyte composed of an aqueous zinc chloride solution or an aqueous zinc chloride and ammonium chloride solution.

10. A process for producing a dry cell comprising the steps:
(a) assembling within a cupped cylindrical container the active components of a dry cell including in addition to an anode, a cylindrical cathode depolarizer mix cake, a separator disposed between said anode and said cathode depolarizer mix cake and a cathode collector rod longitudinally embedded in said cathode depolarizer mix cake and protruding from the opened end of said container;
(b) providing a plurality of spaced apart channels extending within the annular volume of the cathode depolarizer mix cake parallel to the cathode collector rod and terminating within the cathode depolarizer mix cake;
(c) feeding a predetermined amount of an electrolyte solution into the longitudinal channels;
(d) placing a cover over the opening of said container; and
(e) sealing the cover to the container.

11. The process of claim 10 wherein step (b) is performed as follows:
(b') placing an annular washer on top of the depolarizer mix cake with the cathode collector rod protruding through a central opening in the washer; and
(b") inserting a piercing means through the washer and into the cathode depolarizer mix cake and then removing the piercing means while restraining the washer, thereby providing a plurality of spaced apart channels extending within the annular volume of the cathode depolarizer mix cake parallel to the cathode collector rod and terminating within the cathode depolarizer mix cake.

12. The process of claim 11 wherein after step (c) the following step is added:
(c') feeding an electrolyte solution onto the annular washer.

13. The process of claims 11 or 12 wherein the piercing means in step (b") are inserted through the midcircle of the cross-sectional annular area of the cathode depolarizer mix cake.

14. The process of claims 10, 11 or 12 wherein the anode is zinc and the depolarizer mix cake comprises manganese dioxide, carbon black and an electrolyte composed of an aqueous zinc chloride solution or an aqueous zinc chloride and ammonium chloride solution.

* * * * *